United States Patent [19]
Yoshida et al.

[11] Patent Number: 5,317,157
[45] Date of Patent: May 31, 1994

[54] INFRARED RAY DETECTING SENSOR WITH GETTER PARTITION

[75] Inventors: Yukihiro Yoshida; Satoshi Ueda; Makoto Itoh; Mitsuo Yoshikawa; Shigeki Hamashima; Hiroyuki Tsuchida; Koji Hirota, all of Kawasaki, Japan

[73] Assignee: Fujitsu Limited, Kawasaki, Japan

[21] Appl. No.: 979,220

[22] Filed: Nov. 20, 1992

[30] Foreign Application Priority Data

Nov. 20, 1991 [JP] Japan ................................. 3-304479
Jul. 22, 1992 [JP] Japan ................................. 4-195225

[51] Int. Cl.⁵ ............................................. G01J 5/06
[52] U.S. Cl. ................................. 250/352; 250/370.15
[58] Field of Search ........................... 250/352, 370.15

[56] References Cited
U.S. PATENT DOCUMENTS
5,012,102  4/1991  Gowlett ........................ 250/352

FOREIGN PATENT DOCUMENTS
63-61123   3/1988  Japan .
243820   10/1988  Japan ................................. 250/352

Primary Examiner—Carolyn E. Fields
Attorney, Agent, or Firm—Staas & Halsey

[57] ABSTRACT

An infrared ray detecting sensor having an infrared ray detecting element located in the cool chamber of a Dewar structure comprising inner and outer cylindrical members. The chamber is evacuated to vacuum level and a getter is arranged in the chamber for ensuring the vacuum level in the chamber. A partition is arranged in the chamber between the inner end of the inner cylindrical member and the getter for forming a restricted passage and allowing communication of a gas between the getter and the infrared ray detecting element and obstructing a stray ray generated upon a radiation of the getter toward the infrared ray detecting element. The restricted passage is formed such that a ray generated upon radiation of the getter is reflected many times at the restricted passage and is dampened. The partition is roughened and colored in black.

21 Claims, 5 Drawing Sheets

INFRARED RAY DETECTING SENSOR WITH GETTER PARTITION

BACKGROUND OF THE INVENTION

1. Field of the Invention

The present invention relates to an infrared ray detecting sensor.

2. Description of the Related Art

Infrared ray detecting sensors are used in a variety of fields, for example, infrared ray detecting sensors are mounted in automobiles or aircraft for determining a target at a distance or in darkness. The infrared ray detecting sensor includes therein an infrared ray detecting element formed of a binary or ternary compound semiconductor, which is usually used in a cold environment at a temperature of, for example, liquid nitrogen (77° K) and accommodated in a heat insulating vacuum housing of a Dewar structure. The housing of a Dewar structure comprises axially extending and concentric inner and outer cylindrical members to form a chamber therebetween; the infrared ray detecting element being located in the chamber and resting on the inner end wall of the inner cylindrical member. An infrared ray permeable window is arranged in the end wall of the outer cylindrical member opposite the inner end wall of the inner cylindrical member, outside infrared rays passing through the infrared ray permeable window to the infrared ray detecting element. A cooler is arranged in a cavity inside the inner cylindrical member and the infrared ray detecting element is connected to an outside electrical component via leads and ceramic wiring boards.

The chamber formed in the housing is evacuated to a vacuum level and a getter is arranged in the chamber to maintain the chamber at a vacuum level. The getter comprises an enclosure of porous material capable of absorbing gas, as is well known, and an electric heater is arranged in the enclosure. The electric heater is activated during periodic services of the infrared ray detecting sensor.

In such an infrared ray detecting sensor, the getter and the ceramic wiring board, radiate to generate an infrared ray or infrared rays that may reach the infrared ray detecting element as a straying rays and creates a noise at the infrared ray detecting element. When the infrared ray detecting sensor is used in a stationary environment, the straying ray generated at the getter will not necessarily result in a noise since the detected straying ray is at a constant level and can be compensated by the control of the system. However, when the infrared ray detecting sensor is subjected to vibration, the straying ray reaching the infrared ray detecting element continuously changes and cannot be compensated by the control of the system. Thus, there is the problem that the sensitivity of the infrared ray detecting sensor and the quality of the target image thereby obtained is lowered. Also, when the infrared ray detecting sensor is subjected to vibration, contaminated particles in the chamber or particles removed from the getter create a noise at the infrared ray detecting element.

It is known to arrange a cylindrical cold shield on the inner end wall of the inner cylindrical member so as to surround the infrared ray detecting element (for example, refer to Japanese Unexamined Patent Publication (Kokai) No. 63-61123). In this reference, the cold shield extends axially from the inner end wall of the inner cylindrical member toward the infrared ray permeable window of the outer cylindrical member to define an aperture, and a disk or flange is attached to the free end of the cylindrical cold shield.

This disk can prevent a straying ray generated by the radiation of the outer cylindrical member from affecting the infrared ray detecting element and thus may solve the above described problem to some extent. However, the cold shield is attached to the inner end wall of the inner cylindrical member where the temperature of the housing is the lowest and does not extend close to the infrared ray permeable window, and the disk attached to the cold shield also does not extend close to the outer cylindrical member. Therefore, there is a sufficient gap between the disk and the outer cylindrical member to allow a straying ray and particles to reach the infrared ray detecting element. Also, there may be an infrared ray detecting sensor that does not include a cold shield. In addition, while this reference notes a straying ray generated by the radiation of the outer cylindrical member that is at room temperature, the straying ray generated at the getter and the ceramic wiring board is stronger than that generated at the outer cylindrical member and there is no attempt made to effectively prevent the straying ray generated at the getter from affecting the infrared ray detecting element.

SUMMARY OF THE INVENTION

The object of the present invention is to provide an infrared ray detecting sensor by which the sensitivity of the infrared ray detecting sensor and the quality of the target image thereby obtained are good even when the infrared ray detecting sensor is subjected to vibration.

According to the present invention, there is provided an infrared ray detecting sensor comprising: an axially extending inner cylindrical member and an axially extending outer cylindrical member enclosing the inner cylindrical member; the inner cylindrical member having opposite first and second ends; the outer cylindrical member having correspondingly opposite first and second ends with the first end of the outer cylindrical member extending beyond the first end of the inner cylindrical member; first end wall means closing the first end of the inner cylindrical member, second end wall means closing the first end of the outer cylindrical member and including an infrared ray permeable window, third end wall means closing a gap between the second ends of the inner cylindrical member and the outer cylindrical member to form a chamber between the inner and outer cylindrical members and between the first and second end wall means; said chamber being evacuated to a vacuum level, an infrared ray detecting element located in the chamber on the first end wall means of the inner cylindrical member for receiving an infrared ray incident through the infrared ray permeable window, conductor means connecting the infrared ray detecting element to an outside electrical component, at least one getter arranged in the chamber at a position between the first and second ends of the inner cylindrical member for ensuring the vacuum level in the chamber, and at least one partition arranged in the chamber between the first end of the inner cylindrical member and the getter for forming a restricted passage and allowing communication of a gas between the getter and the infrared ray detecting element and obstructing a stray ray generated upon radiation of the getter toward the infrared ray detecting element.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
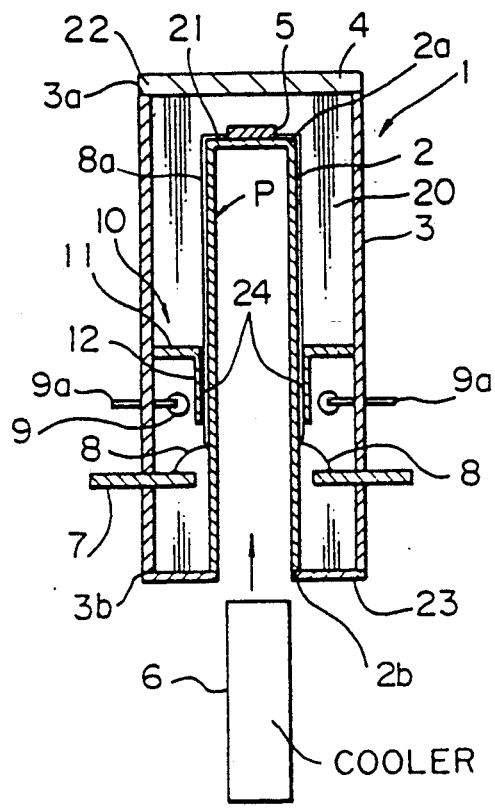
FIG. 1 is a cross-sectional view of a infrared ray detecting sensor according to the first embodiment of the present invention.

In FIG. 1, the infrared ray detecting sensor 1 includes therein an infrared ray detecting element 5 formed of a binary or ternary compound semiconductor such as HgCdTe that is accommodated in a heat insulating vacuum housing of a Dewar structure. The housing of the Dewar structure comprises an axially extending inner cylindrical member 2 of Kovar glass and an axially extending and concentric outer cylindrical member 3 of Kovar to form a chamber 20 therebetween. The outer cylindrical member 3 has a length greater than that of the inner cylindrical member 2 and one end of the outer cylindrical member 3 extends beyond the inner cylindrical member 2.

The inner cylindrical member 2 has a first end 2a closed by a first end wall 21 and a second open end 2b. The outer cylindrical member 3 has a first end 3a closed by a second end wall 22 facing the first end wall 21 and a second open end 3b. A third end wall 23 closes a gap between the second ends 2b and 3b of the inner and outer cylindrical members 2 and 3. The infrared ray detecting element 5 is mounted on the first end wall 21 in the chamber 20.

The second end wall 22 comprises an infrared ray permeable window 4 made of a plate of germanium coated with a particular material so that an infrared ray in a particular bandwidth of wavelength can pass through the infrared ray permeable window 4 to the infrared ray detecting element 5 to excite same. A pattern of conductor material 8a is provided on the surface of the inner cylindrical member 2 to electrically connect the infrared ray detecting element 5 to a ceramic wiring board 7 by leads 8 and the ceramic wiring board 7 is partly inserted in the chamber 20; the ceramic wiring board 7 being connected to an outside electrical component. A constant bias current is applied to the infrared ray detecting element 5 and a change in resistance of the infrared ray detecting element 5 in response to the intensity of the infrared ray received by the latter is monitored as a change in voltage.

A cooler 6 is arranged in a cavity inside the inner cylindrical member 2. The cooler 6, for example, may be of the type utilizing the Joule-Thomson effect or the type having liquid nitrogen contained therein. The cooler 6 may be concentrated and cool the inner end wall 21 of the inner cylindrical member 2 to effectively cool the infrared ray detecting element 5. Accordingly, there is a temperature distribution along the inner cylindrical member 2. The temperature may be relatively low in a range from the inner end wall 21 of the inner cylindrical member 2 to a position P at a certain distance from the inner end 2a of the inner cylindrical member 2, and the temperature may be relatively high in a range from the position P to the outer end 2b of the inner cylindrical member 2.

As is well known, the chamber 20 is evacuated at vacuum level and a getter 9 is arranged in the chamber 20 to maintain the chamber 20 to vacuum level. The getter 9 comprises an enclosure of porous material capable of absorbing gas, and an electric heater (not shown) arranged in the enclosure. The getter 9 is carried by a pair of electrode rods 9a that are partially inserted in the chamber 20 for connection of the getter 9 to an outside electrical component. The electric heater is activated during periodic service of the infrared ray detecting sensor 1.

According to the present invention, a partition 10 is arranged in the chamber 20 between the inner end 2a of the inner cylindrical member 2 and the getter 9 for forming a restricted passage 24 and allowing communication of a gas between the getter 9 and the infrared ray detecting element 5 and obstructing a straying ray generated upon radiation of the getter 9 toward the infrared ray detecting element 5. Preferably, the partition 10 is located between the position P and the getter 9, so that the partition 10 is not cooled or the cooling energy is not absorbed by the partition 10.

In the embodiment of FIG. 1, the partition 10 comprises a disk 11 extending from the outer cylindrical member 3 toward the inner cylindrical member 2; the disk 11 having an axially elongated integral tubular inner end portion 12 so that the passage 24 is formed between the inner end portion 12 of the disk 11 and the inner cylindrical member 2. It is, of course, possible to extend the disk from the inner cylindrical member 2 toward the outer cylindrical member 3 and in this case, the disk 11 has an axially elongated tubular outer end portion so that a passage is formed between the outer end portion of the disk and the outer cylindrical member 3.

Figure 2:
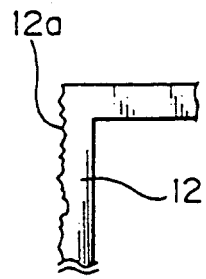
FIG. 2 is a partially enlarged view of the partition of FIG. 1.

As shown in FIG. 2, the inner end portion 12 of the disk 11 has at least a roughened surface 12a that faces the inner cylindrical member 2, and the surface of the partition 10 including the roughened surface 12a is colored in black. The partition 10 is made from Kovar, for example, and subjected to a sand blasting process to obtain the roughened surface 12a. The partition 10 is welded to the outer cylindrical member 3 so that the inner end portion 12 faces the inner cylindrical member 2 with a small gap therebetween.

The partition 10 obstructs a major portion of the straying rays generated at the getter 9 and the ceramic wiring board 7, and the remaining portion of the straying rays will enter the restricted passage 24 between the inner end portion 12 of the disk 11 and the inner cylindrical member 2. A straying ray will reflect many times at the restricted passage 24 (diffused reflection) and is dampened, thereby preventing the straying ray from reaching the infrared ray detecting element 5. Particles are also obstructed at the passage 24 but gas can pass through the passage 24 to maintain the chamber 20 at vacuum level by the action of the getter 9.

In the preferred embodiment, the unevenness of the roughened surface 12a of the partition 10 is approximately 20 micrometers, and the gap between the roughened surface 12a and the inner cylindrical member 2 is within a range from 200 to 1000 micrometers. Thus, the reflection of a straying ray occurs many times.

Figure 3:
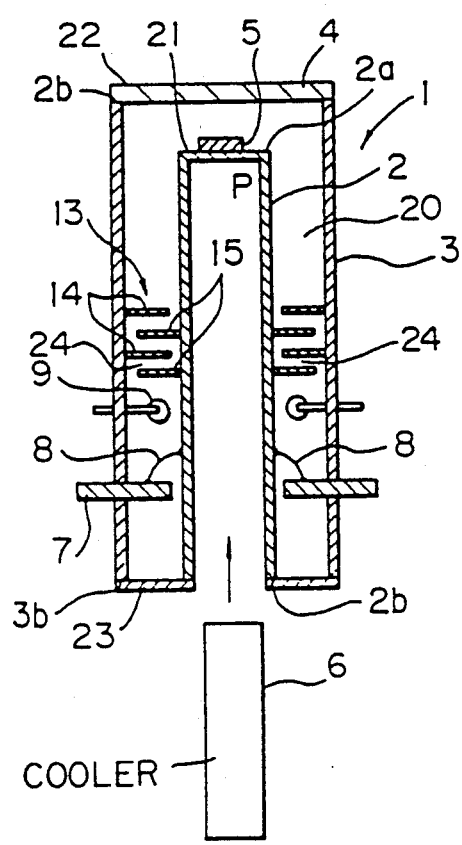
FIG. 3 is a cross-sectional view of an infrared ray detecting sensor according to the second embodiment of the present invention.
Figure 4:
FIG. 4 is a partially enlarged view of one of the partitions of FIG. 3.

FIGS. 3 and 4 show the second embodiment of the present invention. Identical elements are shown by the identical numerals throughout the embodiments.

In FIG. 3, the infrared ray detecting sensor 1 also comprises a partition 13 in the chamber 20 between the inner end 2a of the inner cylindrical member 2, and the getter 9, and preferably between the portion P and the getter 9, for forming a restricted passage 24 and allowing communication of a gas between the getter 9 and the infrared ray detecting element 5 and obstructing any straying ray generated upon radiation of the getter 9 toward the infrared ray detecting element 5. The partition 13 comprises at least one first disk 14 extending from the outer cylindrical member 3 toward the inner cylindrical member 2 and at least one second disk 15 extending from the inner cylindrical member 2 toward the outer cylindrical member 3 in a staggered manner so that a passage 24 is formed between the first and second disks 14 and 15. The respective plurality of first and second disks 14 and 15 have free ends overlapping each other and are arranged like mating combs so as to form a long serpentine passage 24. The first and second disks 14 and 15 extend generally perpendicular to the axis of the outer cylindrical member 3.

The first and second disks 14 and 15 are roughened, as shown in FIG. 4, and the roughened surface is also colored in black. The partition 10 is made from Kovar and subjected to a sand blasting process. In this case, a straying ray will reflect many times at the restricted passage 24 and is dampened, thereby preventing the straying ray from reaching the infrared ray detecting element 5. Particles are also obstructed at the passage 24 but gas can pass through the passage 24 to maintain the chamber 20 at vacuum level by the action of the getter 9.

Figure 5:
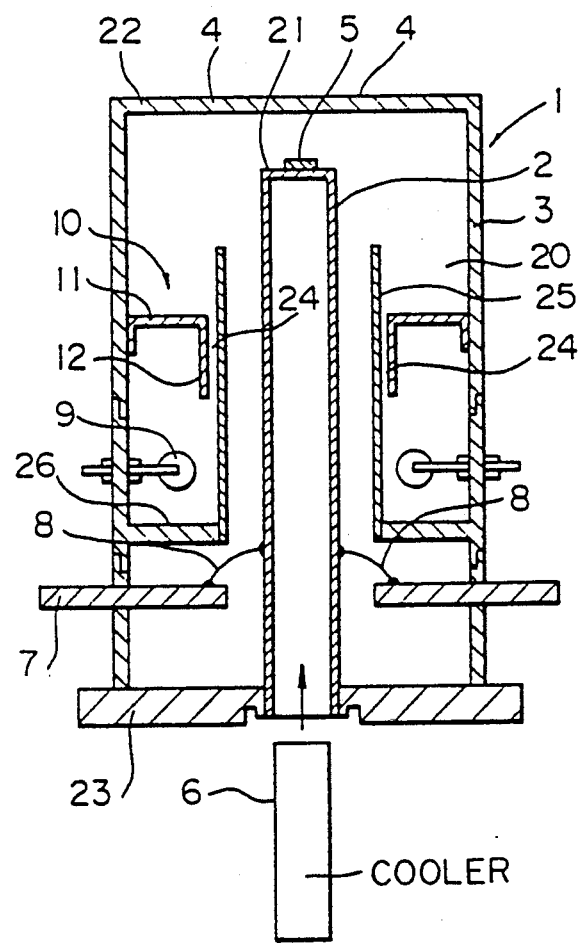
FIG. 5 is a cross-sectional view of an infrared ray detecting sensor according to the third embodiment of the present invention.

FIG. 5 shows the third embodiment of the present invention. The infrared ray detecting sensor 1 comprises an intermediate cylindrical member 25 between the inner and outer cylindrical members 2 and 3 concentric therewith. The getter 9 is arranged between the outer and intermediate cylindrical members 3 and 25. The intermediate cylindrical member 25 shields the inner cylindrical member 2 from radiation of the getter 9 and is called a radiation shield. The intermediate cylindrical member 25 is fixed to the outer cylindrical member 3 by a support disk 26 that is arranged between the getter 9 and the ceramic wiring board 7.

The infrared ray detecting sensor 1 comprises a partition 10, similar to that of FIG. 1, comprising a disk 11 extending from the outer cylindrical member 3 toward the intermediate cylindrical member 25 and having an axially elongated tubular inner end portion 12 so that a passage 24 is formed between the disk 12 and the intermediate cylindrical member 25. This partition 10 functions, in a manner similar to that of FIG. 1. FIG. 5 also shows that the outer cylindrical member 3 comprises a plurality of sections facilitating the assembly of the infrared ray detecting sensor 1 having the partition 10.

It is also possible that a disk can be attached to the intermediate cylindrical member 25 in place of the disk 11 of FIG. 5, so that the disk extends from the intermediate cylindrical member 25 toward the outer cylindrical member 3 so that a passage is formed between the disk and the outer cylindrical member 3. In this case, the disk has an axially elongated tubular outer end portion in place of the axially elongated tubular inner end portion 12 of FIG. 5 so that a passage is formed between the outer end portion of the disk and the outer cylindrical member 3. Also, it is possible to replace the partition 10 of FIG. 5 with the partition 13 of FIG. 3, or the partition 13 of FIG. 8.

Figure 6:
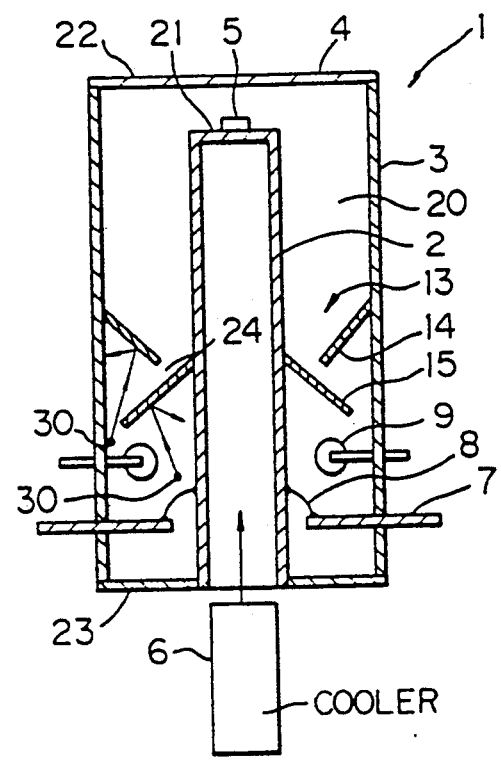
FIG. 6 is a cross-sectional view of an infrared ray detecting sensor according to the fourth embodiment of the present invention.

FIG. 6 shows the fourth embodiment of the present invention. The infrared ray detecting sensor 1 comprises a partition 13 comprising a pair of first and second disks 14 and 15 extending from the outer cylindrical member 3 and from the inner cylindrical member 2 in a staggered manner, similarly to FIG. 3, but each of the first and second disks 14 and 15 of FIG. 6 is arranged at an angle to the axis of the outer cylindrical member 3 toward the getter 9. Accordingly, particles or a stray ray in the region of the chamber 20 containing the getter 9 are reflected by the first and second disks 14 and 15, as shown by the arrows 30. The angle of the inclination of the first and second disks 14 and 15 can be selected experimentally, and preferably is within the range between 30 to 45 degrees.

Figure 7:
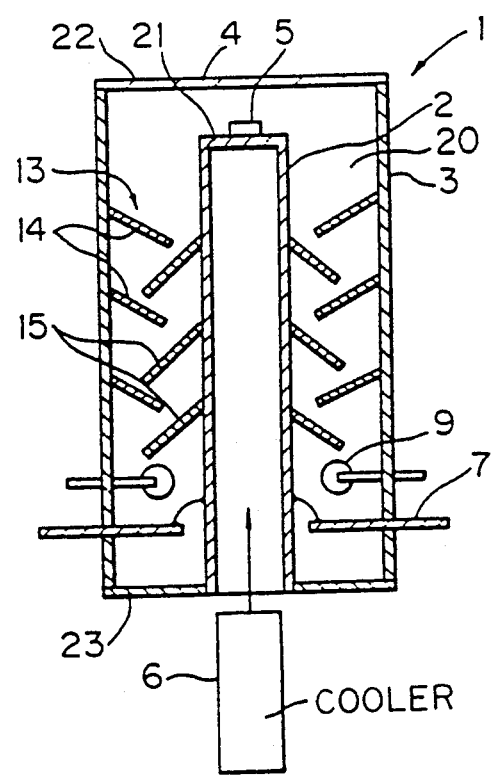
FIG. 7 is a cross-sectional view of an infrared ray detecting sensor according to the fifth embodiment of the present invention.

FIG. 7 shows the fifth embodiment of the present invention. The infrared ray detecting sensor 1 comprises a partition 13 comprising a plurality of pairs of first and second disks 14 and 15 extending from the outer cylindrical member 3 and from the inner cylindrical member 2 in a staggered manner, similarly to FIG. 6.

Figure 8:
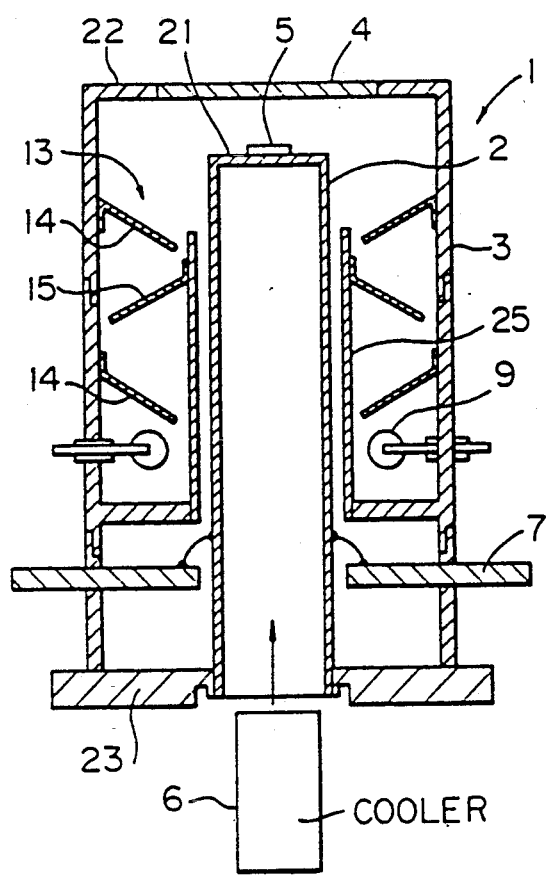
FIG. 8 is a cross-sectional view of an infrared ray detecting sensor according to the sixth embodiment of the present invention.

FIG. 8 shows the sixth embodiment of the present invention. The infrared ray detecting sensor 1 comprises a partition 13 comprising first and second disks 14 and 15 extending from the outer cylindrical member 3 and from the inner cylindrical member 2 in a staggered manner, similarly to FIG. 6. In this example, two first disks 14 and one second disk 15 are arranged. The infrared ray detecting sensor 1 also comprises an intermediate cylindrical member 25 and the partition 13 is arranged between the outer and intermediate cylindrical members 3 and 25. The outer cylindrical member 3 comprises a plurality of sections facilitating the assembly of the infrared ray detecting sensor 1 having the partition 10.

Figure 9:
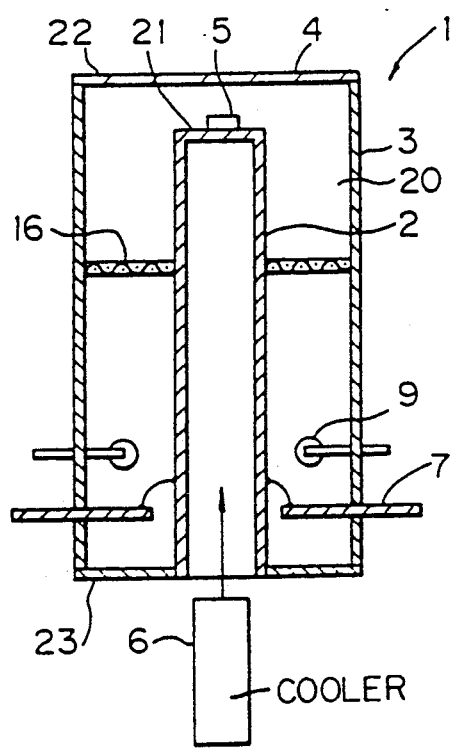
FIG. 9 is a cross-sectional view of an infrared ray detecting sensor according to the seventh embodiment of the present invention.

FIG. 9 shows the seventh embodiment of the present invention. The infrared ray detecting sensor 1 comprises a partition comprising a filter 16 extending between the outer and inner cylindrical members 3 and 2. The filter 16 comprises a wire net having a fine mesh.

We claim:
1. An infrared ray detecting sensor comprising:
an axially extending inner cylindrical member and an axially extending outer cylindrical member enclosing the inner cylindrical member; the inner cylindrical member having opposite first and second ends; the outer cylindrical member having correspondingly opposite first and second ends with the first end of the outer cylindrical member extending beyond the first end of the inner cylindrical member;

first end wall means closing the first end of the inner cylindrical member; second end wall means closing the first end of the outer cylindrical member and including an infrared ray permeable window; third end wall means closing a gap between the second ends of the inner cylindrical member and the outer cylindrical member so as to form a chamber between the inner and outer cylindrical members and between the first and second end wall means; said chamber being evacuated to a vacuum level;

an infrared ray detecting element located in the chamber on the first end wall means of the inner cylindrical member for receiving an infrared ray incident through the infrared ray permeable window;

conductor means connecting the infrared ray detecting element to an outside electrical component;

at least one getter arranged in the chamber at a position between the first and second ends of the inner cylindrical member for ensuring the vacuum level of the chamber; and at least one partition arranged in the chamber between the first end of the inner cylindrical member and the at least one getter for forming a restricted passage and allowing communication of a gas between the at least one getter and the infrared ray detecting element and obstructing a stray ray generated upon radiation of the at least one getter toward the infrared ray detecting element;

said restricted passage being formed such that a ray generated upon radiation of the at least one getter is reflected a plurality of times at the restricted passage and is dampened.

2. An infrared ray detecting sensor according to claim 1, wherein said at least one partition is located between a position at a certain distance from the first end of the inner cylindrical member toward the second end thereof and the getter.

3. An infrared ray detecting sensor according to claim 1, wherein said at least one partition has at least one roughened surface.

4. An infrared ray detecting sensor according to claim 1, wherein said at least one partition has at least one surface colored in black.

5. An infrared ray detecting sensor according to claim 1, wherein said at least one partition has at least one surface roughened and colored in black.

6. An infrared ray detecting sensor according to claim 1, wherein said at least one partition comprises at least one disk extending from the outer cylindrical member toward the inner cylindrical member so that the passage is formed between said at least one disk and the inner cylindrical member.

7. An infrared ray detecting sensor according to claim 6, wherein said at least one disk has an axially elongated tubular inner end portion so that the passage is formed between the inner end portion of said at least one disk and the inner cylindrical member.

8. An infrared ray detecting sensor according to claim 1, wherein said at least one partition comprises at least one disk extending from the inner cylindrical member toward the outer cylindrical member so that said passage is formed between the said at least one disk and the outer, cylindrical member.

9. An infrared ray detecting sensor according to claim 8, wherein said at least one disk has an axially elongated tubular outer end portion so that the passage is formed between the outer end portion of said a least one disk and the outer cylindrical member.

10. An infrared ray detecting sensor according to claim 1, wherein said at least one partition comprises at least one first disk extending from the outer cylindrical member toward the inner cylindrical member and at least one second disk extending from the inner cylindrical member toward the outer cylindrical member in a staggered manner so that a passage is formed between the first and second disks.

11. An infrared ray detecting sensor according to claim 1, wherein the outer cylindrical member has an axis, and said at least one partition extends generally perpendicular to the axis of the outer cylindrical member.

12. An infrared ray detecting sensor according to claim 1, wherein the outer cylindrical member has an axis, and said at least one partition extends at an angle to the axis of the outer cylindrical member.

13. An infrared ray detecting sensor comprising:

an axially extending inner cylindrical member and an axially extending outer cylindrical member enclosing the inner cylindrical member; the inner cylindrical member having opposite first and second ends; the outer cylindrical member having correspondingly opposite first and second ends with the first end of the outer cylindrical member extending beyond the first end of the inner cylindrical member;

first end wall means closing the first end of the inner cylindrical member; second end wall means closing the first end of the outer cylindrical member and including an infrared ray permeable window; third end wall means closing a gap between the second ends of the inner cylindrical member and the outer cylindrical member so as to form a chamber between the inner and outer cylindrical members and between the first and second end wall means; said chamber being evacuated to a vacuum level;

an intermediate cylindrical member arranged between the inner and outer cylindrical members concentrically therewith;

an infrared ray detecting element located in the chamber on the first end wall means of the inner cylindrical member for receiving an infrared ray incident through the infrared ray permeable window;

conductor means connecting the infrared ray detecting element to an outside electrical component;

at least one getter arranged in the chamber at a position between the first and second ends of the inner cylindrical member for ensuring the vacuum level of the chamber, said at least one getter further being positioned between the outer and intermediate cylindrical members; and at least one partition arranged in the chamber between the first end of the inner cylindrical member and the at least one getter for forming a restricted passage and allowing communication of a gas between the at least one getter and the infrared ray detecting element and obstructing a stray ray generated upon radiation of the at least one getter toward the infrared ray detecting element.

14. An infrared ray detecting sensor according to claim 13, wherein the intermediate cylindrical member is fixed to the outer cylindrical member by a support disk that is arranged between the at least one getter and the conductor means.

15. An infrared ray detecting sensor according to claim 13, wherein said at least one partition comprises at least one disk extending from the outer cylindrical member toward the intermediate cylindrical member so that the passage is formed between said at least one disk and the intermediate cylindrical member.

16. An infrared ray detecting sensor according to claim 15, wherein said at least one disk has an axially elongated tubular inner end portion so that the passage is formed between the inner end portion of said at least one disk and the intermediate cylindrical member.

17. An infrared ray detecting sensor according to claim 13, wherein said at least one partition comprises at least one disk extending from the intermediate cylindrical member toward the outer cylindrical member so that the passage is formed between said at least one disk and the outer cylindrical member.

18. An infrared ray detecting sensor according to claim 17, wherein said at least one disk has an axially elongated tubular outer end portion so that the passage is formed between the outer end portion of said at least one disk and the outer cylindrical member.

19. An infrared ray detecting sensor according to claim 14, wherein said at least one partition comprises at least one first disk extending from the outer cylindrical member toward the intermediate tube and at least one second disk extending from the intermediate cylindrical member toward the outer cylindrical member in a staggered manner so that the passage is formed between the first and second disks.

20. An infrared ray detecting sensor according to claim 19, wherein the outer cylindrical member has an axis, and the first and second disks extend at an angle to the axis of the outer cylindrical member.

21. An infrared ray detecting sensor comprising:
an axially extending inner cylindrical member and an axially extending outer cylindrical member enclosing the inner cylindrical member; the inner cylindrical member having opposite first and second ends; the outer cylindrical member having correspondingly opposite first and second ends with the first end of the outer cylindrical member extending beyond the first end of the inner cylindrical member;
first end wall means closing the first end of the inner cylindrical member; second end wall means closing the first end of the outer cylindrical member and including an infrared ray permeable window; third end wall means closing a gap between the second ends of the inner cylindrical member and the outer cylindrical member so as to form a chamber between the inner and outer cylindrical members and between the first and second end wall means; said chamber being evacuated to a vacuum level;
an infrared ray detecting element located in the chamber on the first end wall means of the inner cylindrical member for receiving an infrared ray incident through the infrared ray permeable window;
conductor means connecting the infrared ray detecting element to an outside electrical component;
at least one getter arranged in the chamber at a position between the first and second ends of the inner cylindrical member for ensuring the vacuum level of the chamber; and
at least one partition arranged in the chamber between the first end of the inner cylindrical member and the at least one getter for forming a restricted passage and allowing communication of a gas between the at least one getter and the infrared ray detecting element and obstructing a stray ray generated upon radiation of the at least one getter toward the infrared ray detecting element, said partition comprising at least one filter means extending between the outer cylindrical member and the inner cylindrical member, said filter means being in the form of a continuous annular shape around the inner cylindrical member.

* * * * *

UNITED STATES PATENT AND TRADEMARK OFFICE
CERTIFICATE OF CORRECTION

PATENT NO. : 5,317,157
DATED : May 31, 1994
INVENTOR(S) : Yukihiro YOSHIDA et al.

It is certified that error appears in the above-identified patent and that said Letters Patent is hereby corrected as shown below:

Column 1, line 45, change "RAYS" to --ray--.

Column 7, line 66, delete ",".

Column 9, line 26, change "14" to --13--.

Signed and Sealed this

Sixth Day of September, 1994

Attest:

BRUCE LEHMAN

*Attesting Officer*  *Commissioner of Patents and Trademarks*